Figure 1:
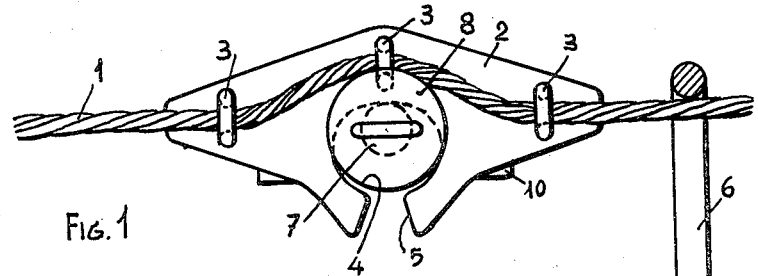

United States Patent Office 3,193,050
Patented July 6, 1965

3,193,050
DEVICE FOR PERMANENTLY HOLDING TO A SAFETY LINE WORKMAN OPERATING ON HIGH PLACES
Gastone Galante, via Piave 143A, Mestre, Venice, Italy
Filed Aug. 27, 1963, Ser. No. 304,924
Claims priority, application Italy, Sept. 18, 1962, 675,908
4 Claims. (Cl. 182—3)

When there is a necessity of executing works at substantial heights, at points not provided with railings and from which a workman may easily fall, there are used safety lines which are fastened by their ends to the structures of the construction and along which a ring or spring hook connected to the safety belt of the workman is made to slide, so that in case the workman should fall, the said line would support him.

However, when the working area is quite large, it is necessary to arrange anchorings intermediate to the safety line, but said anchorings prevent the ring or spring hook from sliding freely, so that the former may not be used, while the latter must be disengaged right before the anchoring and engaged again after the same. Consequently, for a short period of time, the workman is not held with the necessary safety.

It may also happen that the workman, through negligence, fails to perform said operation, leaving his spring hook disengaged, with serious consequences also for the staff responsible for the work.

The present invention has for its object a device for holding the safety line, suitable to avoid the above disadvantages.

The device for securely holding a workman, who must operate in high places, to a safety line, held both at its ends and intermediate points, in which the workman is held to the safety line by means of a ring completely closed, during the work and passed through by the safety line itself, according to the invention, is characterized in that the safety belt, to be applied to the waist of the workman who has to work in high places, is connected to a special spring hook having an ovoid bore passed through by the safety line and suitable to allow the passage beyond the anchoring, and in that the intermediate fixed points of anchoring to the support means comprise a plate or the like to which the safety line is rigidly connected and which is supported in a movable way by a fixed anchoring shaft or the like, without possibility of disengagement, by a shape permitting the ovoid ring of the safety belt to pass the anchoring shaft without disengaging from the safety line.

The above device is further characterized in that the above plate is provided with a bore opened towards one of the sides thereof, so that to permit passage of a branch of the ovoid ring of the spring hook, but not the anchoring shaft, the bore being bigger than the shaft by such an amount as to allow introduction inside said bore of the branch of the said ring and to permit an easy movement of said branch around the shaft contained within the bore.

The above device is also characterized in that known fastening elements rigidly secure the said plate to the safety line.

The above device, in which the means connecting the safety belt to the safety line has elements suitable to disengage it therefrom, is still characterized in that said elements are kept closed by means of safety devices like locks and the like.

The accompanying drawings show, by way of example only, an embodiment of the device according to the present invention.

Figure 2:
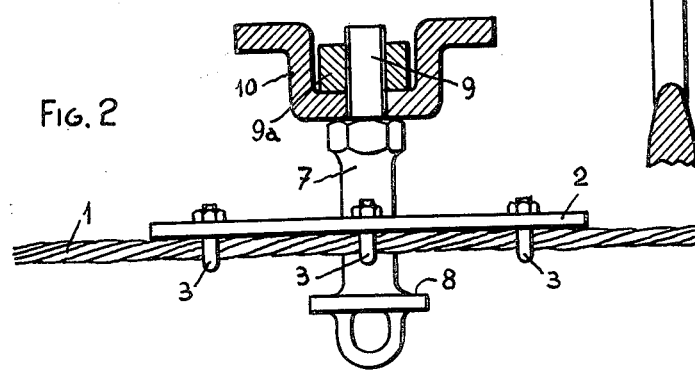
Figure 3:
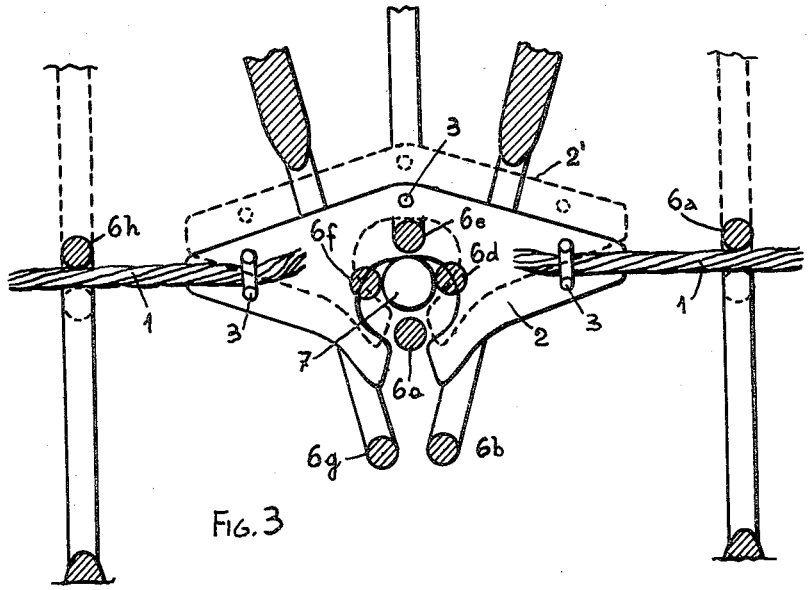

FIG. 1 is a front view of the safety line, limited to the portion in correspondence to an intermediate anchoring device; FIG. 2 is the plan view thereof partly in section; FIG. 3 is the front semi-section showing the different steps of the passage beyond the anchoring means of the connecting element to the safety belt.

Referring to the drawing, a safety line 1 is secured at its ends to the structure of the construction on which the safety line is used by suitable fastening means (not shown). A plate 2 is secured to the safety line 1 intermediate its ends by means of suitable clamps 3 which are shown in the form of U-bolts which pass through the plate 2 and are secured by nuts. The plate 2 is shown as being somewhat elongated with tapering end portions and is provided approximately centrally with a bore 4 which opens to one side edge of the plate through an opening 5 which is smaller than the diameter of the bore 2. An ovoid ring 6 is connected to the workman's safety belt through a rope, chain or the like (not shown) and is preferably in the form of a split ring or spring hook which can be opened to put it on the safety line 1 and then closed by means of a lock (not shown) so as to be sure that the ring will not be disengaged from the line while the workman is working. The opening 5 in plate 2 is of such size as to let a branch of the ovoid ring 6 pass through the opening into the bore 4. The line 1 passes around the bore 4 on the opposite side from the opening 5 so as not to obstruct the opening. An anchoring shaft 7 passes through the bore 4 and is of a diameter less than the diameter of the bore by an amount greater than the cross sectional diameter of said branch of the spring hook ring 6. The shaft 7 is larger than the opening 5 so that it cannot pass through the opening. An abutment surface 8 of a larger diameter than the bore 4 prevents the plate 2 from slipping off the outer end of the shaft 7. At its inner end, the shaft 7 is secured by a bolt portion 9 and nut 9a to a bracket 10 which is rigidly connected to the structure of the construction.

The device operates as follows. The ring 6 attached to the workman's safety belt is applied to the safety line 1 and is then closed and preferably locked so that it cannot be removed. The ring 6 is slidable along the safety line 1 to permit the workman to travel along the line.

When the workman arrives at the location of an intermediate anchoring of the safety line 1, he takes the ovoid ring 6 of the spring hook in position 6a, and makes it turn upwards to position 6b, introducing it into the opening 5 of plate 2 in position 6c until it reaches position 6d. By lifting plate 2 to position 2', he then makes the ring pass over the anchoring shaft 7 and then take position 6f, 6c and 6g until it reaches position 6h which is similar to position 6a, but on the other side of the anchoring shaft.

The vertical oscillations of safety line 1 are kept within the vertical space existing between the edge of the bore 4 and the diameter of shaft 7, which cannot come out of said bore as opening 5 is narrower than the diameter thereof and as the surface of abutment 8 is larger than the diameter of bore 4.

In such a way a workman can travel along the safety line 1 in a continuous manner and there is not required any disengagement, even temporary, of the safety belt therefrom, at any point of its length and for any course.

Although a preferred embodiment of the present invention has been described and shown in the accompanying drawings, many modifications and variations may be made within the scope of the invention, as for instance by obtaining the anchoring of the shaft 7 to the structure either by means of welding or clamps, jaws or the like; all these modifications and variations however, being based on the main idea of the present invention.

What I claim is:
1. A device for securely holding a workman who must operate in high places on a structure comprising an ovoid ring adapted to be attached to a safety belt for the workman, a safety line passing through said ring and secured at its ends to said structure, a plate secured to said line intermediate its ends and having a maximum transverse width less than the larger inside dimension of said ring, a bore through said plate, an opening from said bore to a side edge of said plate, said opening having a width less than the crosswise dimension of said bore, a support shaft secured to said structure and extending through said bore, said shaft having a crosswise dimension less than that of said bore but greater than the width of said opening, an abutment on said shaft larger than said bore to retain said plate on said shaft, said ring being movable past said plate and support shaft by passing a portion of said ring through said opening, around the portion of said shaft and said bore and back out through said opening.

2. A device according to claim 1 wherein said bore and the cross sectional shape of said shaft are approximately circular, the diameter of said shaft being less than diameter of said bore by an amount greater than the cross sectional diameter of said ring portion.

3. A device according to claim 1 wherein said plate has a greater length than width and in which said line is secured to one face of said plate and passes around said bore on the side thereof opposite said opening.

4. A device according to claim 3 in which said line is secured to said plate by clamps extending through said plate and clamping said line against said face of said plate.

References Cited by the Examiner

UNITED STATES PATENTS

| 276,057 | 4/83 | Luscher | 182—5 |
| 1,899,162 | 2/33 | Lackner | 182—3 |
| 2,626,447 | 1/53 | Hunt | 182—3 |
| 2,684,875 | 7/54 | Kirchner | 182—3 |

HARRISON R. MOSELEY, *Primary Examiner.*